United States Patent
Nolan et al.

(10) Patent No.: US 10,039,172 B2
(45) Date of Patent: Jul. 31, 2018

(54) CONTROLLING A LIGHTING SYSTEM USING A MOBILE TERMINAL

(71) Applicant: PHILIPS LIGHTING HOLDING B.V., Eindhoven (NL)

(72) Inventors: Julian Charles Nolan, Eindhoven (NL); Matthew John Lawrenson, Eindhoven (NL); Alexander Henricus Van Eeuwijk, Einhoven (NL); Hilbrand Vanden Wyngaert, Eindhoven (NL); William Nathan Chelton, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/114,393

(22) PCT Filed: Jan. 30, 2015

(86) PCT No.: PCT/EP2015/052023
§ 371 (c)(1),
(2) Date: Jul. 26, 2016

(87) PCT Pub. No.: WO2015/114123
PCT Pub. Date: Aug. 6, 2015

(65) Prior Publication Data
US 2016/0345414 A1    Nov. 24, 2016

(30) Foreign Application Priority Data
Jan. 30, 2014   (EP) .................................... 14153296

(51) Int. Cl.
*G08C 19/00*   (2006.01)
*H05B 37/02*   (2006.01)
*G08C 17/02*   (2006.01)

(52) U.S. Cl.
CPC ......... *H05B 37/0272* (2013.01); *G08C 17/02* (2013.01); *G08C 2201/30* (2013.01);
(Continued)

(58) Field of Classification Search
CPC ............ H05B 37/0272; H05B 37/0254; H05B 33/0845; H05B 33/0857; H04L 9/0891; H04L 9/3221
See application file for complete search history.

(56) References Cited

U.S. PATENT DOCUMENTS

2006/0092037 A1*   5/2006   Neogi .................... G08C 23/04
                                                        340/4.3
2010/0204807 A1*   8/2010   Isaacson ............ G05B 19/0426
                                                        700/28
(Continued)

FOREIGN PATENT DOCUMENTS

FR       2898719 A1    9/2007
WO       0017737 A1    3/2000
(Continued)

OTHER PUBLICATIONS

Samir Patel, EIC 2800 Search Report, Jul. 19, 2017, Scientific and Technical Information Center.*

*Primary Examiner* — Tung X Le
*Assistant Examiner* — Raymond R Chai

(57) ABSTRACT

The disclosure relates to the control of a lighting system illuminating a space such as a room. The controller receives signals from a mobile user terminal, including an indication of a user input entered by a user via an on-screen user interface of the mobile user terminal. The controller is also able to determine a position from which the user input was entered by the user. Further, each of a plurality of discrete control policies is associated with a respective positional demarcation within the space in question, where each control policy defines a respective type of response of the illumination to one or more on-screen elements of the lighting-control user interface. Based on this association, the controller selects one of the control policies associated with
(Continued)

the determined position. The controller then controls the lighting system to provide the illumination in accordance with the response defined by the selected control policy.

13 Claims, 3 Drawing Sheets

(52) U.S. Cl.
CPC ..... *G08C 2201/91* (2013.01); *G08C 2201/92* (2013.01); *G08C 2201/93* (2013.01); *Y02B 20/445* (2013.01)

(56) References Cited

U.S. PATENT DOCUMENTS

| | | | |
|---|---|---|---|
| 2011/0234492 A1* | 9/2011 | Ajmera | G06F 3/017 345/158 |
| 2012/0217882 A1 | 8/2012 | Wong et al. | |
| 2014/0285113 A1* | 9/2014 | Huang | H05B 37/0272 315/297 |
| 2015/0382436 A1* | 12/2015 | Kelly | G08C 17/02 315/131 |
| 2016/0066393 A1* | 3/2016 | Bosua | H05B 37/0245 315/307 |
| 2016/0309569 A1* | 10/2016 | Rangineni | G05B 15/02 |
| 2017/0171941 A1* | 6/2017 | Steiner | H05B 37/0254 |

FOREIGN PATENT DOCUMENTS

| | | | | |
|---|---|---|---|---|
| WO | WO 0017737 A1 * | 3/2000 | | G08C 19/28 |
| WO | 2013001432 A1 | 1/2013 | | |
| WO | 2013075154 A1 | 5/2013 | | |

\* cited by examiner

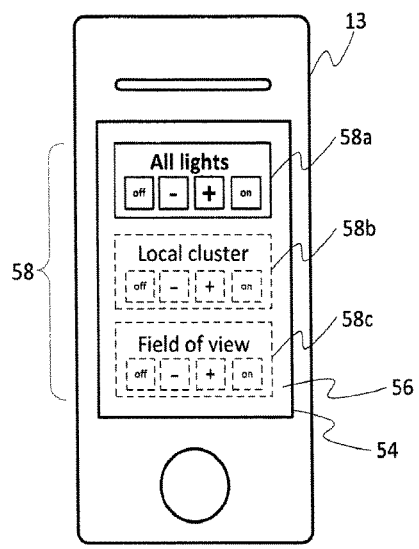
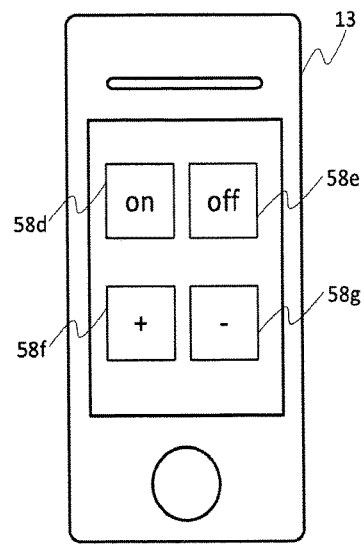
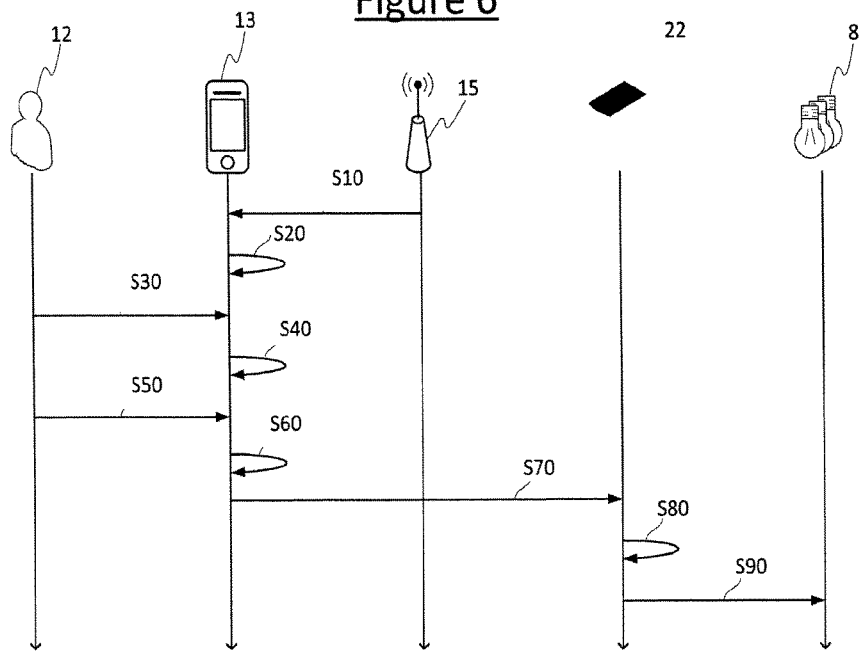

CONTROLLING A LIGHTING SYSTEM USING A MOBILE TERMINAL

CROSS-REFERENCE TO PRIOR APPLICATIONS

This application is the U.S. National Phase application under 35 U.S.C. § 371 of International Application No. PCT/EP2015/052023, filed on Jan. 30, 2015, which claims the benefit of European Patent Application No. 14153296.0, filed on Jan. 30, 2014. These applications are hereby incorporated by reference herein.

TECHNICAL FIELD

The present disclosure relates to the control of a lighting system based on a user input entered through an on-screen user interface of a mobile user terminal.

BACKGROUND

It is known to be able to remotely control the lights in a room based on an input from a mobile user terminal such as a smartphone, tablet or laptop computer installed with a suitable lighting control application. The mobile terminal comprises a wireless transceiver capable of communicating with a transceiver of the lighting system, typically operating based on a short-range RF technology such as Wi-Fi or Bluetooth. The application running on the mobile terminal is thereby able to send a request to a controller of the lighting system, and assuming the mobile terminal or user meets any conditions for being allowed to control the lighting (if any) then the controller generates a corresponding lighting control command to control the lighting accordingly. For example the user is typically provided the option of switching the lights on or off, or dimming the lights up or down.

It is also known that the particular light sources the user can control from his or her terminal may be limited based on location. The location of the mobile terminal can be determined relative to a plurality of reference nodes having known locations, e.g. the anchor nodes of an indoor location system. This is achieved by measuring properties of signals transmitted between the mobile terminal and reference nodes, and inferring the location from which the combination of those properties must have been experienced or would have most likely been experienced; e.g. by measuring signal properties such as time of flight and/or signal strength relative to the reference nodes and performing a calculation such as trilateration or multilateration to infer the mobile terminal's location. Combining this calculation with the known location of the reference nodes (e.g. determined from a location database), it is thus possible to determine the location of the mobile terminal in more absolute terms, e.g. relative to a floor plan, map, globe or other reference framework. The lighting system can then use such information to determine which light source or sources the user is allowed to control from his or her current location.

In one example, the user is only allowed to control the lights in the same room or corridor within which his or her terminal is detected to be located, but not the lights in other rooms or corridors operated under that same system (e.g. in the same building). So for instance the user can only use the mobile terminal to switch on and off or dim those of the system's light sources in the same room as the detected location; but others of the lights sources in that system are not affected by any user input the user enters through the mobile terminal.

In another example, only those lights within a certain range of the detected location can be controlled. Thus the lights are controlled in an approximate circle or ring around the user. In another implementation, the lights are turned on in a brightness distribution around the user such that the brightness of the different light sources decreases with their distance from the detected location.

SUMMARY

Even in systems where the control is limited based on location, the system still always exhibits the same type of behaviour wherever the user goes. For instance in an implementation where the user is allowed to dim the lights in the same room, then the user's terminal can only ever operate just those lights, regardless of what room the user is in or where within a room the user is. Similarly in an implementation where the lights are turned on in a ring or brightness distribution around the user, then wherever the user goes, the user terminal would still always simply provide the same function of raising or lowering the lights in the same distribution around the detected location. I.e. the control always works according to the same function of position.

It is recognised herein on the other hand, that it would be desirable if not only the lighting itself was controlled based on position, but also if the way in the control works could also vary in dependence on position. Accordingly, in the following disclosure, different control policies are applied depending on user position, where each policy defines a different respective type of response of the lighting to input from the user terminal. I.e. each control policy provides a different relationship between the user interface and the response of the lighting, and the selection between these different policies is dependent on position. The term "position" as used herein may refer to location and/or orientation, so for example different types of responses may be assigned to different zones within a room or other space, and/or the response may depend on the direction the user is facing.

For instance a user at the entrance of a room may wish to dim all the light sources in the room uniformly, while a user sitting at a desk may wish to dim only the light sources around the desk and/or to dim the light sources according to a brightness distribution around the desk. Or as another example, a user may wish to dim only those light sources within his or her field of view, unless no light sources are in the user's field of view in which case an alternative, default policy may be applied. Policies defining other responses may also be provided.

Hence according to one aspect disclosed herein, there is provided a controller for controlling a lighting system to provide illumination in a space occupied by one or more users. The controller comprises communication logic, positioning logic, control policy selection logic, and lighting command logic. The communication logic is able to receive signals from a mobile user terminal, including an indication of a user input entered by a user via a lighting-control user interface provided by an on-screen user interface of the mobile user terminal. Further, the positioning logic is configured to determine a position within said space from which the user input was entered by the user.

The control policy selection logic is configured to operate based on an association such as a database or algorithm which associates each of a plurality of discrete control policies with a respective positional demarcation within said space. Based on this association, the control policy selection logic selects one of the control policies associated with the determined position. Each control policy defines a respective type of response of the illumination to one or more on-screen elements of the lighting-control user interface (through which the user input is entered). The command logic then controls the lighting system to provide the illumination in accordance with the response defined by the selected control policy.

In embodiments, a given user input can be interpreted in dependence on the determined position of the user. The on-screen element through which that user input is entered need not even change from the user's perspective, so that the user continues to operate the interface in the same way regardless of his or her position or the policy being applied, and the translation into the response of the currently selected policy is performed entirely "behind the scenes". Hence in embodiments, each of at least two of said control policies defines a different type of response of said illumination mapped to a same on-screen element of the lighting-control user interface, such that controlling the same on-screen element in the same way causes a different type of response depending on the determined position.

In alternative embodiments, the user interface may be adapted based on the determined position or selected policy, so that the user is presented with different controls reflecting the fact that he or she will be controlling a different function. Hence in embodiments, each of at least two of said control policies defines a different type response of the illumination mapped to a different respective on-screen element of the lighting-control user interface, and the control policy selection logic is configured to operate in coordination with the mobile user terminal such that the user interface adapts to present the user with the respective on-screen element of the selected control policy. The user interface may also emphasise the on-screen element of the selected control policy, and/or hide or suppresses the on-screen element of one or more of the control policies that are not selected.

In further embodiments, as well as the selection of the control policy being based on the determined position, the respective response defined by at least one of the control policies comprises a spatial distribution in the illumination wherein the spatial distribution is also a function of the determined position. I.e. the response defined by at least one of the policies is a function of both user input and user position, in addition to the question of which policy is selected also being a function of position. For example, at least one policy may define a response whereby a plurality of light sources are dimmed in a distribution around the user's location, the distribution being such that the brightness of the light sources decreases with their separation form the user's position. One or more other policies may not define such a spatial distribution, e.g. with at least one policy controlling all the light sources in the relevant space uniformly.

As mentioned, the positional demarcation may comprise either a demarcation in location and/or orientation of the user. For example there may be defined different zones, such as a macro zone which controls light sources uniformly and/or controls all the lights in a certain space, and a non-macro zone which controls only a subset of the light sources within a certain range of the user's position and/or controls light sources according to a spatial distribution whereby intensity decreases with separation from the user's position. Alternatively or additionally, there may be defined different directional demarcations such as demarcations based on the user's field of view. E.g. when one or more light sources in a space are within the user's field of view then the user input may control those light sources (in favour of those not in the user's field of view), while when no light sources are in the user's field of view then a default control policy may be applied (such as that only the one or a subset of the light sources nearest to the user are controlled by the user input). In embodiments, the control of the light sources in the user's field of view may be performed based on a spatial distribution whereby intensity decreases with separation from the user.

In yet further alternative or additional embodiments, there may be provided other control policies associating other responses, positional demarcations, user inputs and/or on-screen user interface elements. Further, policies may be either preconfigured or user-defined (by a commissioning user or end user).

According to a further aspect disclosed herein, there is provided a computer program product configured so as when executed on one or more processing units to perform operations implementing any of the logic or operations mentioned above.

BRIEF DESCRIPTION OF THE DRAWINGS

For a better understanding of the present disclosure and to show how it may be put into effect, reference is made by way of example to the accompanying drawings in which:

FIG. 5a is a schematic illustration of a mobile terminal with user interface, FIG. 5b is another schematic illustration of a mobile terminal and user interface, and FIG. 6 is a schematic signalling diagram of a control policy selection method.

DETAILED DESCRIPTION OF PREFERRED EMBODIMENTS

Figure 1:
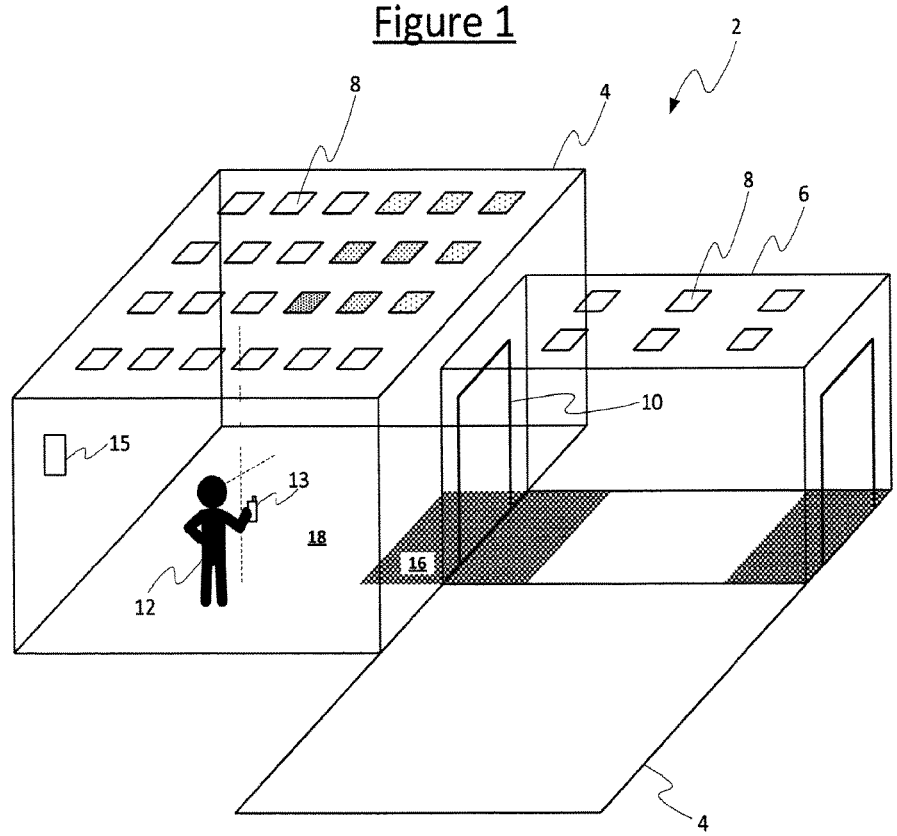
FIG. 1 schematically illustrates an environment comprising a space occupied by a user, FIG. 2a schematically illustrates a technique for positioning relative to reference nodes, FIG. 2b schematically illustrates a time-of-flight based sensing technique.

The following describes examples of a lighting system which automatically selects between different control policies, i.e. different ways in which a user interface of a mobile terminal maps to the control of the lighting, wherein the control policy is selected in dependence on a position from which the user is determined to have entered the user input. As mentioned, position may refer to location and/or orientation. The position may be determined by detecting the position of the mobile user terminal, e.g. by means of trilateration between anchor nodes of a positioning system; and/or may be determined by detecting the position of the user, e.g. by means of a time-of-flight based imaging sensor or presence sensors. Generally it may be assumed that the location of the mobile terminal is approximately the same as the location of the mobile terminal. Further, if it is assumed the user always holds his or her terminal in approximately the same orientation or a known orientation when using its user interface, it may be assumed that the orientation of the mobile terminal is approximately given by the orientation of the mobile terminal.

The selection of the control policy may depend on which of a plurality of predetermined zones the user is found to be located in, and/or on which direction the user is facing. Further, in one or more zones and/or when the user is facing in one or more particular directions, the control is not binary, but rather the influence a user input has relates to distance of the user from one or more of the light sources being controlled. For instance, the influence the user can exert on a plurality of light sources may vary progressively according to how much each light source affects the user's location (a light source that is further away from the user has less effect on the illumination provided to the user's location, and as such the system is arranged such that, reciprocally, the user's input will have less influence on the light sources that are further away than those that are nearer). In embodiments, one or more of the control policies may also take into account the location of the user versus the location of other users in the same space, such that the influence a user's input has on each light source depends on the user's location relative to the one or more other users as well as the location relative to the light source. Further, the distance of the user from one or more light sources may also influence which functions the user is granted access to.

The absolute location of users in the space may be detected by a mobile user terminal or other device disposed about the user's person, or by other means such as a ToF based imaging sensor or presence sensors. This absolute location may be used to determine whether the user is in a certain allocated zone, e.g. a "macro zone". Macro zones are zones disclosed herein, which may be set aside to have "macro" function irrespective of the user's distance from the light sources in question. An action performed by the user in a macro zone is applied to the entire area associated with the macro zone. For example, someone standing at the entrance to an office may have complete control of all the office lights, despite being outside of the main floor of the office where the input entered by the user may be proportionally interpreted according to the proximity and/or orientation of a user relative to light sources of the system. Note that "proportional" as used herein does not necessarily mean proportional in the strict mathematical sense, i.e. not necessarily a linear relationship between any two quantities such as the change in intensity of the illumination and a number of "+" or "−" button presses, or between change in intensity and a degree through which an on-screen control wheel is dialled (though such relationships would be examples of possible embodiments).

Figure 3:
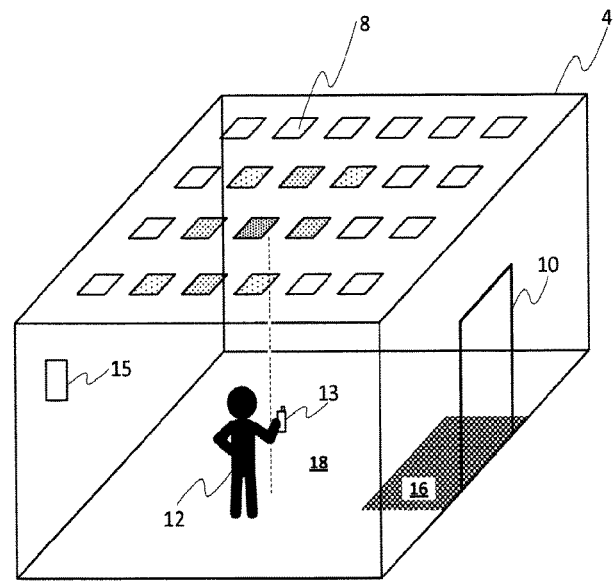
FIG. 3 is another schematic illustration of a space occupied by a user.

FIGS. 1 and 3 provide schematic illustrations of an environment 2, which may comprise an indoor environment such as one or more rooms 4 and/or corridors 6 of a building such as an office, and/or an outdoor environment such as a garden or park. The environment 2 is installed with a lighting system comprising a plurality of light sources 8. A light source 8 may refer to a luminaire comprising one or more lamps, or to an individual lamp of a luminaire. For example the light sources 8 may be mounted on the ceiling, walls, floor or ground, or may be disposed elsewhere such as in free-standing units.

The environment 2 provides a space occupied by a user 12, and that space is illuminated by at least some of the light sources 8. The space in question may refer to the whole environment 2 or an area within that environment. For example in the case of the interior of a building, the space in question may be a single room 4 or corridor, an area within a room 4 or corridor 6, or any combination of one or more rooms 4 and/or corridors 6 or areas within them. For the purpose of illustration, in the following discussion the space will be a room 4, such that where reference is made to all the light sources in the space or illuminating the space or the like, this refers to all the light sources in or illuminating the relevant room 4. However, it will be appreciated that in other embodiments the control may be set-up to operate based on any other spatial apportionment in the environment 2 or across the whole environment 2.

The lighting system also comprises at least one wireless receiver or transceiver 15 configured to communicate with a mobile user terminal 13 of the user 12, e.g. via a short-range RF access technology such as Wi-Fi or Blue tooth. The wireless transceiver 15 is at least configured to receive requests from the mobile user terminal 13, sent in response to a user input entered through a graphical, on-screen user interface of the mobile user terminal 13, e.g. a touch screen plus suitable UI layer of an operating system running on the terminal 13. The mobile user terminal 13 is installed with a lighting control application configured so as when executed on the terminal 13 to provide a lighting control user interface through the terminal's user interface. The lighting control user interface comprises one or more on-screen elements through which the user can enter a user input, e.g. one or more buttons which the user can press, or one or more variable controls such as an on-screen control wheel. The user input entered in this manner is received by the lighting control application on the mobile user terminal 13, which in turn sends a corresponding request to the lighting system via the wireless transceiver 15.

Further, the lighting system is able to determine a location from which the user input was entered by the user. This may be the position of the mobile terminal 13 as measured by the mobile terminal 13 and communicated to the lighting system via the wireless transceiver 15, and/or the position of the mobile terminal 13 as measured by a network (e.g. indoor location system) and communicated to the lighting system via the wireless transceiver 15 or other means (e.g. a connection to a local wired network or the Internet). Alternatively or additionally, the determined position may be the position of the user as detected by a positioning system of the lighting system, e.g. based on a time-of-flight imaging sensor, and/or a system of presence sensors such as ultrasound or infrared sensors. The mobile user terminal 13 is disposed about the user's person, typically being held while he or she is using it to control lighting, so the position of the mobile user terminal 13 and the position of the user 12 may be considered equivalent for the present purposes.

In embodiments, the space 4 may be sub-divided into a plurality of discrete zones 16, 18, corresponding to different sub-areas of the space 4 in which the user may be detected to be located when using the mobile terminal 13. For example in one embodiment the zones comprise a first zone 16 which acts as a "macro" zone in a sub-area around the entrance 10 to the room 4, while the remainder of the room 4 is designated as a second zone 18 which acts as a "proportionate" or "selective" zone. These will be discussed in more detail shortly.

Figure 2A:
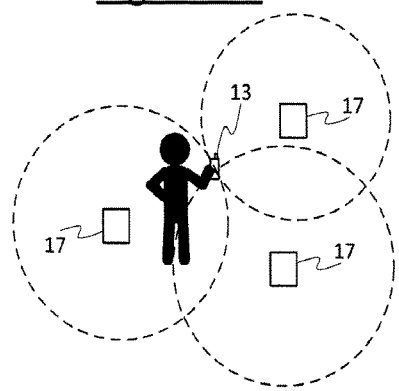

FIG. 2a illustrates one category of techniques by which the location of the mobile terminal 13 may be determined. Here, the mobile user terminal 13 is found in communication with a plurality of reference nodes 17 whose locations can be known. The determination of the mobile terminal's location may be based on either a "device centric" or "network centric" approach, or a hybrid of the two. In a device centric approach, the mobile terminal 13 receives a respective signal from each of a plurality of reference nodes 17 within range and measures a given property of each signal, e.g. time-of-flight or signal strength. The mobile terminal 13 then performs a calculation (e.g. trilateration) to determine the location at which the mobile terminal 13 must be (or is most likely to be) situated in order to have experienced the particular combination of these measurements. The mobile terminal 13 then transmits an indication of the determined location to the lighting system via its wireless transceiver 15. In a network centric approach, each of a plurality of reference nodes 17 within range of the mobile user terminal 13 each receive a respective signal from the mobile terminal 13, and each takes a respective measurement of a given property of the respective signal, e.g. again time of flight or signal strength. The reference nodes 17 form at least part of location network, and the measurements are transmitted to a common element of the location network, e.g. a separate location sever. The location server then performs the calculation (e.g. trilateration) to determine the mobile terminal's location from these measurements and transmits an indication of the determined location to the lighting system via its wireless transceiver 15 or other means (e.g. wired local network or the Internet). In a hybrid approach, the device takes the measurements but returns them to the network to perform some or all or the calculation, or vice versa.

For example, the reference nodes 17 may be anchor nodes of an indoor positioning system installed in the space 4 or environment 2, and the locations of the anchor nodes are stored in a location database of the indoor positioning system. In a device centric approach, the mobile terminal 13 detects its location relative to the anchor nodes 17 and also looks up the absolute locations of the anchor nodes 17 in the location database (via a suitable communication channel with the positing system, e.g. via a local wired or wireless network or the Internet). The "absolute" locations are the locations relative to a more broadly encompassing framework such as a map, floor plan or the globe, i.e. a framework by which the location of other objects than just the anchor or reference nodes 17 in isolation can be judged. Given the absolute location of the anchor nodes 17 and the location of the mobile device 13 relative to the anchor nodes 17, the mobile 13 can then determine its absolute location on a map, floor plan or the like. In a network centric variant, the location network determines the relative location, looks up the anchor node locations in the location database, and determines the mobile's absolute location. Either way, the absolute location of the mobile terminal 13 may thus be provided to the lighting system.

In another example, the reference nodes 17 may be satellites of a satellite based positioning system, such as GPS. In this case the mobile terminal 13 receives respective signals from each of a plurality of the satellites, takes measurements of the signals and determines its location relative to the satellites, based on similar principles as discussed above. The satellite system also tracks the absolute locations of the satellites, so that the relative location can be translated into an absolute location. The calculation and/or look-up may be performed by the mobile terminal 13 (device centric approach) or a component of the satellite based location system (network centric approach), and reported from either to the lighting system.

As well as location, or as an alternative, the lighting system may be configured to operate based on the orientation of the user 12. In embodiments this may be determined based on one or more on-board sensors of the mobile terminal 13. For example a magnetometer (compass) may be used to determine the orientation of the mobile terminal 13 relative to the globe, or a system of accelerometers incorporated into the mobile terminal 13 may be used to track its direction of motion (if it is assumed the user always walks forward, the direction of motion gives an indication of the orientation). Thus the mobile terminal 13 may report an indication of the orientation to the lighting system, via the wireless transceiver 15.

Figure 2B:
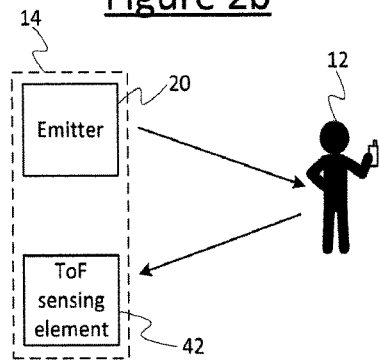

FIG. 2b illustrates another technique for determining location and/or orientation of a user. This may be used in conjunction with or as an alternative to any of the above techniques. Here, the lighting system comprises at least one sensor 14 installed somewhere in the space 4 or with a view into the space 4. In embodiments the sensor 14 comprises a time-of-flight sensor, comprising a time-of-flight sensing element 42 which is able to sense radiation emitted by an emitter and reflected back via objects in the space 4.

The emitter may be a dedicated emitter 20 which may be considered part of the sensor 14 (as illustrated). In this case the emitted radiation may be radiation other than visible light, e.g. infrared, RF or ultrasound; or alternatively may comprise visible light. Non-visible radiation may be chosen so as not to intrude upon or be confused with the other visible light in the space 4. And/or, the emitted radiation may comprise a certain identifier or signature so that it can be distinguished from other radiation in the environment, e.g. embedded with a certain code, or be given a characteristic waveform, frequency or spectrum. For example if the radiation is visible light then it may be embedded with an identifier by being modulated according to coded light techniques (e.g. see WO/127439), such that sensor 14 can recognise it when received back from amongst the light from various other light sources. Alternatively if all the light sources 8 illuminating the space 4 are synchronised with the capture, then such an identifier or signature may not be required. Alternatively the radiation used in the time-of-flight sensing may be from an incidental source such as one or more of the light sources 8 which are already emitting visible light into the space for the purpose of illumination. In this case the emitter 20 may be replaced with a suitable interface for synchronising the ToF sensing with pulsed emission by one or more of the light sources 8.

The emission from the emitter 20 (or 8) is synchronised with the detection via the sensing element 42, either by controlling the emitter 20 to emit in synchronisation with the capture rate of the sensing element 42, or by controlling the sensing element 42 to capture data in synchronisation with the modulation of the radiation from the emitter 20, or by controlling both the sensing element and emitter together. Thus the relative timing of the emission and capture is known, so the ToF controller is able to associate time-of-flight information with the captured data.

Some of the emitted radiation will be reflected from the user 12 back towards the sensor 14. As it is synchronised with the emission, the sensor 14 can be used to determine the amount of time between emission from the emitter 20 and reception back at the sensing element 42, i.e. time-of-flight information. Further, the sensing element 42 takes the form of a two-dimensional pixel array, and is able to associate a time-of-flight measurement with a measurement of the radiation captured by some or all of the individual pixels. Thus the time-of-flight sensor 14 is operable to capture a depth-aware or three-dimensional image of the space 4, including the user 12. In the case where the sensing element 42 captures visible light, the time-of-flight sensor may also be referred to as a depth-aware or 3D camera. By applying image recognition to the depth-aware or 3D images captured by the sensor 14, it is possible to detect information such as the location of the user 12 in the space 4, and/or the direction in which he or she is facing (e.g. based on facial recognition). Details of time-of-flight based image sensing in themselves will be familiar to a person skilled in the art.

In yet another example, the sensor(s) 14 may alternatively or additionally comprise one or more other sensors. For example, the lighting system may be provided with one or more further time-of-flight imaging sensors disposed at other points in the space 4, and the information from the sensors 14 may be used together to detect user position. Alternatively or additionally, the sensor(s) 14 may comprise one or more other types of sensor. For example, one or more two-dimensional cameras may be used in conjunction with image recognition techniques to detect user position. As another example, the lighting system may be provided with a plurality of ranging presence sensors such as active ultrasound sensors, which emit pulses of ultrasound and detect echoes of their respective pulses. If the user is within range of a plurality of such presence sensors so that the distance to each is able to be detected, then a trilateration type calculation may be performed to detect the user's location, similarly to FIG. 2a.

In yet further examples, the position of the mobile terminal 13 may be determined based on a measure of the luminance received by a camera or other light sensor of the mobile terminal 13, and/or based on an image acquired by a camera of the mobile terminal 13 and processed such that the user's likely position and/or orientation can be computed. In another example, the positioning could be based on coded light signals from a plurality of the light sources 8, detected via a camera or other light sensor of the mobile terminal 13. In this case the measured signal property, such as intensity, in conjunction with a respective ID of the light source 8 embedded in the light from each light source 8 can indicate how far the mobile terminal 13 is from each of a plurality of the light sources 8. E.g. this information may be used to determine the position of the mobile terminal 13 based on a trilateration type calculation similar to that described above, and/or by using image recognition or another type of algorithm to infer where the mobile terminal 13 must be in order to see the particular light sources 8 in view in an image it captures with its camera.

Any of the above positioning techniques may be used alone or in any combination to implement various possible embodiments.

Figure 4:
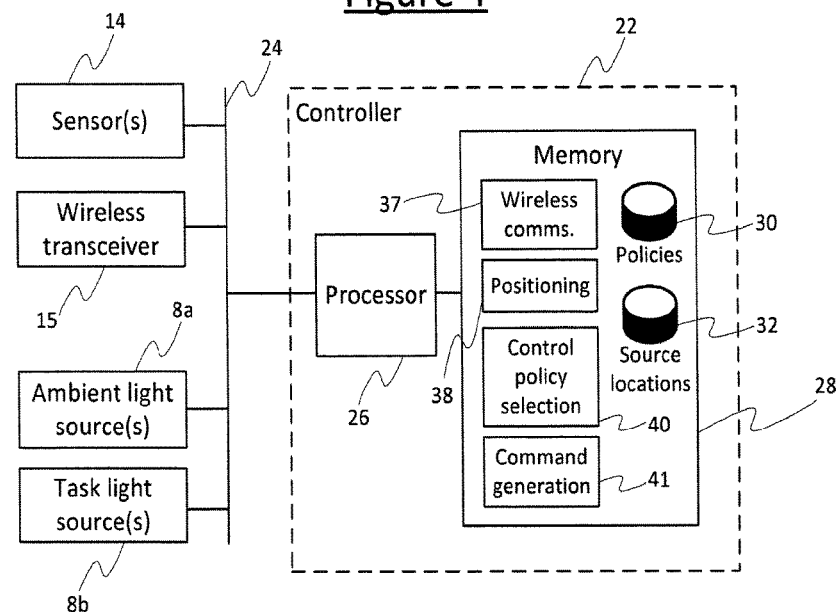
FIG. 4 is a schematic block diagram of a lighting system.

FIG. 4 is a schematic block diagram of a lighting system including control functionality. The lighting system comprises the one or more wireless transceivers 15, the light sources 8, and a controller 22; all connected together by a suitable interconnect system 24 comprising one or more wired or wireless channels, such as an I2C bus, a DMX bus, a DALI bus, Ethernet connection Wi-Fi connection or Zig-Bee connection. The controller 22 is arranged to receive requests from the mobile user terminal 13 via the wireless transceiver 15, and to receive position related information from the mobile terminal 13 and/or a separate positioning system via the wireless transceiver 15 and/or other means (e.g. local wired network or the Internet). Based on these signals, the controller 22 is further arranged to output control commands to the light sources 8 via the interconnect system 24 in order to control the light sources 8. In embodiments the light sources 8 may comprise different kinds of light sources such as ambient lighting 8a (illuminating the space 8 generally) and task lighting 8b (targeted on a specific area within the space 4 such as a work surface, e.g. desk).

The controller 22 comprises: wireless communication logic 37, positioning logic 38, control policy selection logic 40, and command generation logic 41. In embodiments each of these is implemented as a portion of code stored on a memory 28 comprising one or more storage media, and arranged to be executed on a processor 26 comprising one or more processing units. Note therefore that the term logic does not imply hardware circuitry (though that would be an alternative implementation for some or all of the logic). In embodiments some or all of the components or functionality of the controller 22 may be implemented on a server (comprising one or more server units over one or more sites), and/or some or all of the controller 22 may be implemented in a dedicated control unit installed in the space 4 or environment 2.

The wireless communication logic 37 is arranged to receive one or more requests from the mobile terminal 13 to control the lighting 8, the requests being transmitted from the lighting control application running on the mobile terminal 13 in response to a user input entered through the lighting control user interface it provides. The requests are received at the controller 22 via wireless communication between the wireless transceiver 15 and a corresponding transceiver on the mobile terminal 13, e.g. based on Wi-Fi, Bluetooth or Zigbee as a wireless access technology. Alternatively it is not excluded that the communications could be relayed to a wired transceiver of the controller 22 via a wireless access point or the like. Either way, the communication logic 37 is configured to process the requests to identify a lighting control operation requested by the user 12, and to output an indication of the requested operation to the control policy selection logic 40.

The positioning logic 38 is arranged to receive the position related information from the mobile terminal 13 (in an at least partially device centric implementation), and/or from a separate positioning system (in an at least partially network centric implementation). The position related information may be received via the wireless transceiver 15, e.g. based on Wi-Fi, Bluetooth or Zigbee; and/or via other means such as a wired local network or the Internet. The positioning logic 38 is configured to process this information to determine a position (location and/or orientation) within the space 4 from which the user 12 entered the user input, and to output an indication of the detected position to the control policy selection logic 40. Note that where it is said the positioning logic 38 determines the position, this does not necessarily mean that any or all of the positioning calculations are performed there. Indeed, as discussed above, in embodiments the calculation of the mobile terminal's position may be performed at the mobile terminal 13 itself and reported explicitly from the mobile terminal 13 to the positioning logic 38 of the controller 22; or the position may be calculated by a separate positioning system based on measurements taken by the mobile terminal 13 or nodes 17 of the location network, and reported from the positioning system to the positioning logic 38 of the controller 22. Nonetheless, in other embodiments the mobile terminal 13 or a separate positioning system may report "raw" or partially processed measurements to the lighting controller 22, and the positioning logic 38 may indeed perform some or all of the remaining calculation there (in this case, effectively the controller 22 of the lighting system takes on some or all of the roll of a network centric positioning system). Generally to "determine" may cover either calculating or determining by other means such as receiving a report from another component or device.

The control policy selection logic 40 is arranged to receive an indication of the detected position from the positioning logic 38 and an indication of the user's requested operation from the communication logic 37. The control policy selection logic 40 is also arranged to access a control policy database 30 and a commissioning database 32, which may be stored locally (on local memory 28) or remotely (e.g.

on a server accessed via a network such as the Internet), or a combination of local and remote storage. The commissioning database 32 maps the respective locations of the light sources 8 against respective identifiers of those light sources 8. The control policy database 30 maps control policies to respective combinations of user input and user position. Each database 30, 32 could take the form of any data structure, and a relatively small look-up table may suffice in the case of smaller lighting systems. Alternatively or additionally, in some implementations, analytical means of mapping may be used, i.e. an algorithm or formula, in place of either or both of these databases 30, 32. The following will be described in terms of a database implementation, but it will be appreciated that the teachings extend to other implementations.

In embodiments the control policy database 30 defines the operating zones which are utilised by the lighting controller 22. These may be expressed in a number of ways, e.g.: (i) as a measure of distance between the user and the known location of one of the light sources 8 comprised by the lighting system, (ii) as a measure of distance between the user 12 and the ToF emitter 20 (or 8) and/or receiver 42, (iii) as a measure of the luminance received by the mobile terminal 12, and/or (iv) as a measure of the user's distance and orientation relative to light sources 8 controlled by the lighting system using an image acquired by the mobile terminal 13. For example the control policy database 30 may define the lighting control functionality associated with one or more user inputs at one of more distances from one or more light sources 8, and or from the ToF emitter 20 and/or detector 42.

The commissioning database 32 contains the respective locations of the commissioned light sources 8. It will be appreciated that given a known absolute location for the light sources 8 and the user 12 (or equivalently his or her mobile terminal 13), then the relative distance of the user 12 from the light sources 8 may be computed. The locations of the light sources 8 in the commissioning database 32 may thus be used by the control policy logic 40 to determine positional demarcations or implement policies that are based on the position from which the user entered a user input into his or her mobile terminal, relative to one or more of the lights sources 8. Optionally the commissioning database may also comprise information on the layout of the space 4 or obstacles in the space 4, for use in assessing positional demarcations specified based on which light sources are in a user's field of view.

An administrator may configure the system. This may comprise of a number of steps including: entering an administration mode, selecting and loading existing control policies in the policy database 30, and creating new control policies in the policy database 30. For example new control policies may be created by the administrator to define a plurality of different types of responses the lighting system may be configured to have (e.g. local vs. macro control, and/or uniform vs. brightness distribution) in response to one or more kinds of user input that may be entered via the mobile terminal 13, and to associate these with various zones within the area where users are to have control of the lighting system. Zones or other positional demarcations may be defined in a number of ways, e.g. based on the light sources 8 within the user's field of view, and/or based on the proximity to the nearest light source 8. One or more user inputs may also be defined in a number of ways. For example: the user presses "on" and "off" buttons to switch the lights on or off; and/or the user presses a "+" (plus) button or turns an on-screen wheel clockwise to increase lighting intensity, and presses a "−" (minus) button or turns an on-screen wheel anticlockwise to decrease lighting intensity. Settings defining responses to such inputs are stored in the policy database 30, and the type of response is dependent on position.

Based on the mapping in the control policy database 30, the detected position from the positioning logic 38, and the requested operation received via the communication logic 37, the control policy selection logic 40 selects the policy mapped to the detected position and user input by the policy database 30. Further, the selection logic 40 may dynamically switch between control policies according to the operating context (as the user moves between zones, faces in different directions, and/or performs different user inputs). The control policy selection logic 40 duly outputs an indication of the parameters of the selected policy to the command generation logic 41, which issues one or more commands over the interconnect system 24 in order to control the lighting 8 in accordance with the selected policy, and with the detected position and user input.

To aid understanding, below are several simplified examples of control policies which, in various embodiments, may be defined in the policy database 30.

| Positional demarcation | User input | Policy |
| --- | --- | --- |
| Proportional zone, one or more light sources within field of view | Presses "+" or "−" button [or adjusts variable control] | Dim up or down only those light sources which are within the field of view (e.g. 120 degrees), proportionally according to how far they are located from the user. |
| | Presses "on" or "off" button | Switch on or off only those light sources which are within the field of view (e.g. 120 degrees), proportionally according to how far they are located from the user. |
| Proportional zone, no light sources within field of view | Presses "+" or "−" button [or adjusts variable control] | Dim up or down only the light source 8 nearest the user. |
| | Presses "on" or "off" button | Switch on or off only the light source 8 nearest the user. |
| Macro zone (irrespective of field of view) | Presses "+" or "−" button [or adjusts variable control] | Dim up or down all light sources in the space 4 uniformly. |
| | Presses "on" or "off" button | Dim up all light sources in the space 4 uniformly. |

An example of the effect created by the lighting control policy for the above-defined proportional zone 18 is illustrated schematically in FIG. 1. Here, the lights are controlled in a distribution that is a function of the user's location and direction. When the user 12 enters a user input into the user interface of his or her mobile terminal 12, this will control only those light sources 8 within his or her field of view, shown shaded in the figure. Optionally a range limit may also be imposed on the distance from the user 12, so those lights sources beyond a certain radius are not controlled. Further, the lights are dimmed according to a gradated spatial distribution, whereby the light sources 8 in field of view are dimmed in proportion to their separation in terms of distance from the user 12. That is, for a given user input, the user 12 has a greater influence on those of the field-of-view light sources 8 that are physically closer to the user than those that are further away. This is also illustrated schematically in FIG. 1, with the shading of the most influenced light sources being shown densest and the shading of the least influenced light sources 8 being shown sparsest. The influence could also vary with angular separation from the direction the user is facing.

An example of an alternative control policy that could be applied in a proportional zone 18 is illustrated schematically in FIG. 3. Here the lighting distribution applied in the proportional zone is not a function of field of view, but is still a function of user location. When the user 12 enters a user input into his or her mobile terminal 13, this will control all (and only) those light sources 8 that are within a predetermined range threshold, e.g. a threshold on radius from the user 12 such that the controlled light sources 8 roughly form a circle or ring around the user 12. Of those light sources 8 that fall within this range, the light sources 8 are dimmed in proportion to their respective distance from the user 12. Similarly to FIG. 1, the controlled light sources 8 and the degree of influence are represented schematically by the shading in FIG. 3.

In an example use case, a user 12 is in a room 4. He presses the "+" or "on" button on the user interface of his mobile terminal 13 whilst sitting immediately under a luminaire 8. The luminaire 8 he is standing under increases in intensity, or the luminaires 8 immediately around him increase intensity (depending on the policy definition), but all other luminaires in the room 4 remain unchanged. The user 12 then moves to an entrance 10 of the room 4 and looks into the corridor 6. The user 12 then again presses a "+" or "on" button. The intensity of all the luminaires 8 in the corridor 6 is increased (e.g. based on the fact that the user is in a macro zone 16, or that the luminaires 8 in the corridor 6 are now in the user's field of view). Then the user 12 turns around and looks towards the room 4 he is leaving, which is illuminated by multiple luminaires 8. He presses the "−" or "off" button, and the intensity of all lights in the room 4 is decreased.

Another possibility for either the location-centric or field-of-view centric distributions applied in the proportional zone 18 is that all light sources 8 in the space 4 are controlled, but not uniformly (unlike in the macro zone 16)—i.e. the light sources 8 in the space 4 are still controlled such that the influence exerted through the mobile terminal 13 decreases with the light sources' separation from the user's position, but no absolute distance threshold or angular threshold is imposed within the space 4 (e.g. room) beyond which the user input would have no influence. For example the intensity may decrease radially from the user's location all the way to the edges of the room 4, or those light sources 8 within field of view may be controlled selectively or preferentially but not exclusively, such that the user input influences them to a greater degree than those outside the field of view.

In further embodiments, the control policy selection logic 40 may additionally be configured to apply one or more multi-user arbitration rules to deal with the possibility that two or more users are detected in the same space 4 (e.g. same room) and both attempt conflicting operations at the same time. Any of the above sensing and detection operations may be applied for detecting the position of one or more other users in the space 4. Based on this, the control policy selection logic 40 may be configured to determine the relative position (relative distance and/or orientation) between two or more users requesting lighting control operations, and to moderate the application of a control policy in accordance with the one or more arbitration rules. For example, if the user 12 is in the proportional zone 18 and can observe more than one light source 8, the control he or she has on the light sources 8 which affect other users may be reduced according to the relative effect the light has on (i) the user requesting the operation and (ii) the other user(s). E.g. if one or more other users would be affected more greatly by the operation of one or some of those light sources (e.g. because they are closer), then such light sources may be excluded from those being controlled in the space 4, or influenced to a lesser degree than they would have been otherwise.

As illustrated in the various examples above, the controller 22 is able to define different types of response mapped to one or more on-screen elements of a lighting-control user interface, and to different positional demarcations such as different zones 16, 18 or different viewing angles. Thus the type of response invoked through a mobile user terminal 13 depends on the user input and the position from which the user input was entered.

According to various embodiments, there are different possibilities for the way in which the responses defined by the control policies are mapped to the on-screen elements of the user interface.

One embodiment is exemplified in FIG. 5a. As shown, the mobile user terminal 13 comprises a screen 54 (e.g. touch screen) for providing an on-screen user interface, through which is provided a lighting control user interface 56 of the lighting control application running on the terminal 13. The lighting control user interface 56 comprises a plurality of on-screen elements 58 through which the user 12 can enter a respective user input (which the application then sends as a request to the controller 22 to perform a corresponding function of the lighting system).

In the kind of embodiment illustrated schematically FIG. 5a, each of a plurality a different on-screen elements 58 is mapped to a different respective one of the plurality of possible control policies, thus defining a respective type of response to each of these on-screen elements 58. For example, a macro control policy may be mapped to a first on-screen element 58a (according to which all lights in a space 4 are controlled uniformly), whilst a one proportional or selective type control policy is mapped to a second on-screen element 58b (e.g. a policy of the type shown in FIG. 3 where the lights are controlled in a cluster around the user 12 in proportion to distance from the user), and/or a second proportional or selective type control policy is mapped to a third on-screen element 58c (e.g. a policy of the type shown in FIG. 1 where only the light sources 8 within the user's field of view are controlled).

Each of these on-screen elements 58a, 58b, 58c controls one or more light sources 8 in accordance with the respective control policy mapped to that on-screen element, when the user 12 is found at the corresponding position for the respective control policy to be in force. Such on-screen elements 58a, 58b, 58c may comprise sub-elements such as individual "on", "off", "+" and/or "−" buttons for switching on and off or dimming the respective light source(s) 8 within the limitations allowed by the respective control policy being applied at the user's current location. Those other elements 58a, 58b, 58c mapped to a control policy not currently applied at the user's current position are inactive.

Each of the on-screen elements 58a, 58b and/or 58c may be placed at a different respective area of the screen 54. Optionally, the "inactive" on-screen elements 58a, 58b, 58c may be hidden or suppressed (e.g. greyed out). Any such inactive elements 58a, 58b, 58c that are visible will have no effect on the lighting, though may optionally invoke some alternative effect such as displaying an error message or explanation to the user 12. FIG. 5a shows an example of how the user interface might look when the user is in a macro zone 16.

Alternatively the on-screen elements 58a, 58b and/or 58c may appear at the same or overlapping positions but with different text or graphics to indicate the difference. The different elements will be displayed at different times depending on which policy is currently in force at the user's current position.

Another embodiment is exemplified in FIG. 5b. Here, for each of one or more on-screen elements 58, the same on-screen element 58 is mapped to a plurality of different control policies defining a plurality of different possible responses to that same on-screen element depending on user position. Thus the lighting control user interface 56 comprises the same on-screen element(s) 58 regardless of which of a plurality of control policies is currently applied at the user's current location, but that same element 58 invokes a different type of response depending on the user's position. For example, the elements in question may comprise a single "on" button 58d, a single "off" button 58e, a single "+" button 58f and/or a single "−" button 58g (or single variable dimmer control). The "on" or "+" button always has the same general effect of turning one or more light sources 8 on or dimming them up, but with the effect being adapted in accordance with the control policy being applied at the user's current position. Similarly, "off" or "−" button always has the same general effect of turning one or more light sources 8 off or dimming them down, but again adapted in accordance with the control policy applied at the current location.

An example signalling flow for implementing embodiments of the present disclosure is described below with reference to the signalling chart of FIG. 6.

At step S10, the mobile terminal 13 receives signals from anchor nodes 17 of an indoor positioning system (e.g. Wi-Fi based indoor positioning system). At step S20, the mobile terminal 13 uses the received signals to determine its location (could be device-centric or network-centric techniques).

At step S30, the mobile terminal S30 receives a user input for launching a lighting control application. At step S40, the mobile terminal 13 generates a user interface 56 which the user can operate to control one or more luminaires 8. As discussed, there are at least two options for this: (a) the user interface includes one or more icons which are specific to the determined location, e.g. an 'all lights in your office?' icon if the user is located at his desk, or an 'all lights in the building?' icon if the user is located at the main exit of his office building; or (b) the user interface includes one or more icons which are location independent, e.g. an 'on' icon, an 'off' icon a 'dim-up' icon etc.

At step S50, the mobile terminal 13 receives a user input for controlling one or more luminaires 8, e.g. the user input is a user selection of an "off" icon via the user interface 56. At step S60, the mobile terminal 13 translates the controlling user input into a lighting command. At step S70, the mobile terminal 13 transmits the lighting command to a lighting control server (hosting controller 22).

At step S80, the lighting control server translates the lighting command into one or more control signals for controlling the one or more luminaires 8. The control signals are specified in a lighting control policy, the policy being selected based on the determined location which is incorporated in the lighting command. At step S90, the lighting control server then sends the one or more control signals to the one or more luminaires 8.

Note that the selection of the control policy may be implemented at the controller 22, or in the mobile terminal 13, or a combination of the two or both in parallel. #

For example, lighting control application run on the mobile terminal 13 may be a relatively "dumb" application that simply passes on to the controller 22 an indication of the user's intention to dim or switch on or off the lights, without any particular knowledge of the control policies or which light source(s) 8 should be controlled. In this case the application just sends a bland control request to the controller 22, along with any position related information. The controller 22 then looks up the relevant policy to apply at the user's current position, and interprets the request in dependence on the selected policy to determine which light source(s) 8 to control and in what manner. This type of implementation would be suitable for example in the position-independent user interface embodiment of FIG. 5b.

Alternatively, the lighting control application run on the mobile terminal 13 may be configured to have an awareness of the different policies. In the position-dependent user interface embodiment of FIG. 5a for example, the mobile terminal 13 would need at least some awareness of this. In this case the controller 22 and mobile terminal 13 work in a coordinated fashion so that the user interface 56 reflects the control possibilities that are available. In one embodiment, the application on the mobile terminal 13 may remain relatively "dumb" and the controller 22 instructs the mobile terminal 13 as to which elements it should display in the user interface 56, i.e. effectively the controller 22 controls the user interface 56 remotely. In another embodiment, the controller 22 may communicate to the mobile terminal 13 an indication of one or more control policies that are currently available at the user's present position or which potentially could become available, and the mobile terminal 13 adapts the user interface 56 accordingly. In another embodiment, both the controller 22 and the mobile terminal 13 perform the policy look-up in parallel, e.g. the mobile terminal 13 can access the controller's policy database 30 remotely via the transceiver 15 or other means such as a connection to the Internet. If both the controller 22 and mobile terminal 13 also know the mobile's position, then this way both make the same selection in parallel so that the mobile terminal 13 can adapt its user interface 56 appropriately.

In yet another embodiment, the selection of the control policy is performed at the mobile terminal 13 and communicated to the controller 22. In this case the selection may even be driven exclusively by the mobile terminal 13. For example the control policy database 30 may be stored locally at the mobile terminal 13, or the mobile terminal 13 may access the policy database 30 from a server via a connection to the Internet or a local network. The mobile terminal 12 also knows its own position, and based on this selects which lighting control policy should currently be applied. When the user 12 enters a user input, the mobile terminal 13 itself interprets this and sends a request to the controller 22 specifying which light source(s) 8 should be controlled and in what manner, and the controller 22 acts on this request accordingly (potentially even unconditionally in one possible implementation).

It will be appreciated that the above embodiments have been described only by way of example. While embodiments have been illustrated and described in detail in the drawings and foregoing description, such illustration and description are to be considered illustrative or exemplary and not restrictive, and the invention is not limited to the disclosed embodiments.

For instance, the scope of the disclosure is not limited to the specific policies and associations exemplified above. In embodiments, various combinations of some or all of the following may be implemented in the control policy database 30 (or other means of specifying control polices and associating the policies with positions and user inputs).

The user's relative distance from one or more light sources 8, or other feature of a lighting system (e.g. the user's distance from an average of some or all of the system's light source locations). Example: the further a user is away, the less influence his or her mobile terminal 13 can have on task specific lights 8b, but the greater the influence he or she has on the general ambient lighting 8a.

The effect of a light source 8 or lighting system on the user's location.

Example: the less effect a light has on a user's location, the less control he or she has have over it.

The user's orientation. Example: the direction a user is looking in, and whether looking towards or away from a light source 8, affects his or her perception of the illumination provided by the light source 8.

The effect of a light source 8 or lighting system on other users' locations.

The degree of the user input (e.g. in the case of a variable control like an on-screen control wheel).

The user's absolute location within the space 4, and optionally the absolute location of other users in the space 4. Example: a user in a macro zone 16 may be given control of all lighting in the corresponding space irrespective of other users, while when two or more users are attempting control in a proportional zone 18 then arbitration rules may be applied.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for controlling a lighting system to provide illumination in a space occupied by one or more users, the controller comprising:

communication logic for receiving signals from a mobile user terminal, including receiving a signal comprising an indication of a user input entered by a user via a lighting-control user interface provided by a touch screen user interface of the mobile user terminal;

positioning logic configured to determine a position within said space from which said user input was entered by the user;

control policy selection logic configured, based on an association associating each of a plurality of discrete control policies with a respective positional demarcation within said space, to select one of the control policies associated with the determined position, wherein each control policy defines a respective type of response of said illumination to one or more touch screen elements of the lighting-control user interface through which the user input is entered;

lighting command logic arranged to control the lighting system to provide the illumination in accordance with the response defined by the selected control policy;

wherein each of the plurality of discrete control policies defines a different type of response of said illumination mapped to a same touch screen element of the lighting-control user interface, such that controlling the same touch screen element in the same way causes a different type of response depending on the determined position; and, wherein the touch screen has a fixed appearance to the user that remains unchanged by the controller.

2. The controller of claim 1, wherein each of at least two of said control policies defines a different type response of said illumination mapped to a different respective touch screen element of the lighting-control user interface, and the control policy selection logic is configured to operate in coordination with the mobile user terminal such that the user interface adapts to present the user with the respective touch screen element of the selected control policy.

3. The controller of claim 1, wherein as well as the selection of the control policy being based on the determined position, the respective type of response defined by at least one of the control policies comprises a spatial distribution in the illumination within said space wherein the spatial distribution is also a function of the determined position.

4. The controller of claim 3, wherein the respective type of response defined by at least one of the control policies comprises the illumination being controlled uniformly over said space.

5. The controller of claim 1, wherein the determined position comprises at least a location within said space from which the user input was entered by the user, and the positional demarcation associated with one, some or each of said control policies comprises a respective zone within said space; the control policy selection logic being configured to select said one of the control policies that is associated with the zone within which said location is determined to fall.

6. The controller of claim 5, wherein the lighting system comprises a plurality of light sources providing said illumination, and wherein said zones comprise:

a first zone associated with a control policy whereby all the light sources illuminating the space are controlled in response to the user input ; and a second zone associated with a control policy whereby only a subset of said light sources within a specified vicinity of the determined location are controlled in response to the user input.

7. The controller of claim 5, wherein as well as the selection of the control policy being based on the determined position, the respective type of response defined by at least one of the control policies comprises a spatial distribution in the illumination within said space wherein the spatial distribution is also a function of the determined position; and wherein said zones comprise:
a first zone associated with a control policy whereby the illumination from said light sources is controlled uniformly in response to the user input; and
a second zone associated with a control policy whereby the illumination from some or all of the light sources is controlled according to said spatial distribution.

8. The controller of claim 1, wherein the determined position comprises at least an orientation of the user from which the user entered the user input, and the positional demarcation associated with one, some or all of the control policies comprises a respective directional demarcation; the control policy selection logic being configured to select said one of the control policies that is associated with the directional demarcation within which said orientation is determined to fall.

9. The controller of claim 8, wherein the lighting system comprises a plurality of light sources, and the directional demarcations comprise:
a first directional demarcation corresponding to orientations in which one or more of the light sources are within a field of view of the user, the first directional demarcation being associated with a control policy whereby one or more of the light sources within the field of view are controlled in response to the user input; and
a second directional demarcation corresponding to orientations in which none of said light sources are within the field of view of the user, the second directional demarcation being associated with a control policy whereby a default luminaire is controlled in response to the user input.

10. The controller of claim 8, wherein:
as well as the selection of the control policy being based on the determined position, the respective type of response defined by at least one of the control policies comprises a spatial distribution in the illumination within said space wherein the spatial distribution is also a function of the determined position; and
under the control policy associated with the first directional demarcation, a plurality of the light sources within the field of view are controlled according to said spatial distribution.

11. A mobile user terminal for controlling a lighting system to provide illumination in a space occupied by one or more users;
a touch screen user interface configured to provide a lighting-control user interface for receiving a user input entered by a user;
positioning logic configured to determine position information for use in determining a position within said space from which said user input was entered by the user; and
communication logic configured to operate in conjunction with a controller of the lighting system and, based on an association associating each of a plurality of discrete control policies with a respective positional demarcation within said space, to effect a selection of one of the control policies associated with the determined position; wherein each control policy defines a respective type of response of said illumination to one or more touch screen elements of the lighting-control user interface through which the user input is entered; and
wherein the lighting control user-interface thereby controls the lighting system via the controller to provide the illumination in accordance with the response defined by the selected control policy,
wherein each of the plurality of discrete control policies defines a different type of response of said illumination mapped to a same touch screen element of the lighting-control user interface, such that controlling the same touch screen element in the same way causes a different type of response depending on the determined position; and,
wherein the touch screen has a fixed appearance to the user that remains unchanged by the controller.

12. A lighting system comprising:
one or more light sources configured to provide illumination in a space occupied by one or more users;
a mobile user terminal comprising a touch screen user interface, the touch screen user interface being configured to provide a lighting-control user interface for receiving a user input entered by a user;
a positioning system configured to determine a position within said space from which said user input was entered by the user;
a database associating each of a plurality of discrete control policies with a respective positional demarcation within said space, wherein each control policy defines a respective type of response of said illumination to one or more touch screen elements of the lighting-control user interface through which the user input is entered;
a controller configured to select one of the control policies associated with the determined position, and to control the one or more light sources to provide the illumination in accordance with the response defined by the selected control policy,
wherein each of the plurality of discrete control policies defines a different type of response of said illumination mapped to a same touch screen element of the lighting-control user interface, such that controlling the same touch screen element in the same way causes a different type of response depending on the determined position; and,
wherein the touch screen has a fixed appearance to the user that remains unchanged by the controller.

13. A computer program product for controlling a lighting system to provide illumination in a space occupied by one or more users, the computer program product comprising code embodied on a computer-readable medium and configured so as when executed on one or more processing units to perform operations of:
receiving an indication of a user input entered by a user via a lighting-control user interface provided by a touch screen user interface of the mobile user terminal;
determining a position within said space from which said user input was entered by the user;
based on an association associating each of a plurality of discrete control policies with a respective positional demarcation within said space, selecting one of the control policies associated with the determined position, wherein each control policy defines a respective type of response of said illumination to one or more touch screen elements of the lighting-control user interface through which the user input is entered;
controlling the lighting system to provide the illumination in accordance with the response defined by the selected control policy, wherein each of the plurality of discrete control policies defines a different type of response of said illumination mapped to a same touch screen element of the lighting-control user interface, such that controlling the same on-screen element in the same way causes a different type of response depending on the determined position; and, wherein the touch screen has a fixed appearance to the user that remains unchanged by the controller.

* * * * *